United States Patent Office 2,843,581
Patented July 15, 1958

2,843,581
NEW AZO-DYESTUFFS

Henri Riat, Arlesheim, Switzerland, assignor to Ciba Limited, Basel, Switzerland, a Swiss firm No Drawing. Application January 9, 1956
Serial No. 557,829

Claims priority, application Switzerland January 14, 1955

8 Claims. (Cl. 260—158)

This invention provides new azo-dyestuffs which like, for example, the dyestuff of the constitution (1)

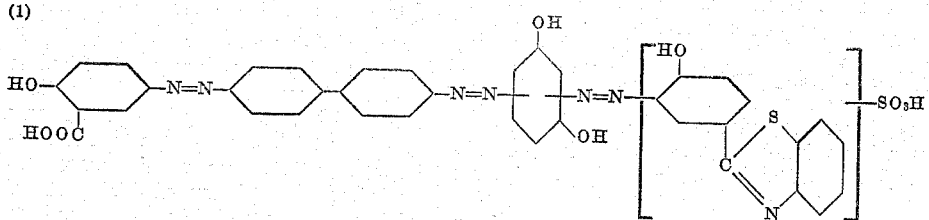

correspond to the formula (2)   $R_3-N=N-R_2-N=N-R_1-N=N-R_4$ in which $R_1$ represents a dihydroxyaryl radical bound to each of the azo linkages in a position vicinal to a hydroxyl group, $R_2$ represents a 1:1'-diphenyl radical bound to the azo linkages in the 4- and 4'-positions, $R_3$ represents the radical of a yellow component, and $R_4$ represents an arylthiazolyl-hydroxybenzene radical bound to the azo linkage in ortho-position to the hydroxyl group.

The invention also provides a process for the manufacture of the above dyestuffs of the Formula 2, wherein a dihydroxyaryl-compound, which contains two carbon atoms each capable of coupling in a position vicinal to a hydroxyl group, is coupled, on the one hand, with a diazoazo-compound obtainable by coupling a tetrazotized 4:4'-diamino-1:1'-diphenyl on one side with a yellow component and is coupled, on the other, with a diazocompound of an aryl-thiazolyl-1-hydroxy-2-aminobenzene.

As dihydroxyaryl-compounds, which contain two carbon atoms capable of coupling each in a position vicinal to a hydroxyl group, there may be used, for example, 1:3-dihydroxyaryl-compounds of the constitution $C_{2+4n}H_{4+2n}O_2$ in which $n$ represents a whole number not greater than 2, that is to say, 1:3-dihydroxynaphthalene and especially 1:3-dihydroxybenzene.

These dihydroxyaryl-compounds are coupled with diazoazo-compounds, which are obtained by coupling a tetrazotized 4:4'-diamino-1:1'-diphenyl, which may contain further substituents on one side with a so-called yellow component. Diamines suitable for this purpose are, for example, the 4:4'-diaminodiphenyl-compounds which are substituted in the 3- and 3'-positions by alkyl or alkoxy groups of low molecular weight or chlorine atoms, and which are frequently used for the production of direct-dyeing dyestuffs, such as 3:3'-dimethyl-, 3:3'-dimethoxy- or 3:3'-dichloro-4:4'-diamino-1:1'-diphenyl. In general $4:4_2$-diamino-1:1'-diphenyl itself is at least equally advantageous.

As yellow components there are to be understood coupling components which yield yellow dyestuffs with diazobenzenes, for example, acylacetylamino-benzenes, especially acetoacetylamino-benzenes, pyrazolones such as 1-phenyl-3-methyl-5-pyrazolone and barbituric acids. There are advantageously used 1-hydroxybenzene-2-carboxylic acids capable of coupling, such as 6-chloro-5- or 6-methyl-1-hydroxybenzene-2-carboxylic acid, and above all 1-hydroxybenzene-2-carboxylic acid itself.

Good results are generally obtained with diazocompounds of aryl-thiazolyl-1-hydroxy-2-aminobenzenes which contain at least one group imparting solubility in water, for example, a carboxylic acid group, a sulfonic acid amide group or especially a sulfonic acid group, and which may contain the aryl-thiazolyl grouping in para-position to the amino group or advantageously in para-position to the hydroxyl group.

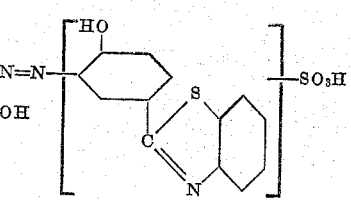

The aryl-thiazolyl-1-hydroxy-2-aminobenzene sulfonic acids may, for example, have the constitution (3)

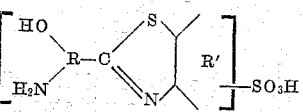

in which R and R' represent benzene radicals, the hydroxyl group is in ortho-position to the amino group, and the benzene radical R' is fused on to the thiazole ring in the manner indicated by the valence bonds. A suitable compound of this kind which corresponds to the formula (4)

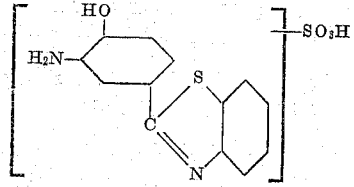

is obtained by monosulfonating 2-(3'-amino-4'-hydroxyphenyl)-benzthiazole (which can also be named 4-[benzthiazolyl-(2)]-2-amino-1-hydroxybenzene), the monosulfonation advantageously being carried out with sulfuric acid containing sulfur trioxide (oleum).

The diazo-compounds and diazo-azo-compounds can be made by the customary known methods and need not be further described. The dihydroxy-aryl-compounds capable of coupling twice may either be coupled first with the diazo-azo-compound and then with the diazocompound containing the 5-membered heterocyclic ring, or may usually with greater advantage first be coupled with the diazo-compound containing the heterocyclic ring and then with the diazo-azo-compound. The two couplings are advantageously carried out in an alkaline medium, for example, a medium rendered alkaline with an alkali metal carbonate.

The new dyestuffs of the Formula 2 are suitable for dyeing or printing a very wide variety of materials, for example, animal fibers such as wool, silk or leather, but especially for dyeing or printing cellulosic materials such as cotton, linen, and artificial silk or staple fibers of regenerated cellulose. The dyestuffs can be converted in substance, in the dyebath or on the fiber into complex metal compounds, for example, copper, chromium, iron, nickel or cobalt compounds. Conversion of the dyestuffs into such complex metal compounds may be carried out by known methods in an acid, neutral or alkaline medium, under atmospheric or superatmospheric pressure, and with or without additions such as salts of inorganic or organic acids, such as tartaric acid, acid-binding agents or agents promoting the formation of complexes, such as pyridine. It is especially advantageous to prepare the metal compounds, especially copper compounds, in substance if the metalliferous dyestuffs are sufficiently soluble. In the case of those dyestuffs of the invention which contain only few groups imparting solubility, they may be treated, for example, advantageously on the fiber or partially on the fiber and partially in the dyebath with the agent yielding metal by methods in themselves known. It is of advantage to use, for example, the process of U. S. Patent No. 2,148,659, in which there are carried out in the same bath first the dyeing and then the treatment with the agent yielding metal. As agents yielding metal there come into consideration those which are stable towards alkaline solutions, such as complex copper tartrates and the like.

In some cases especially valuable dyeings are produced by using the process in which a dyeing or print produced with the metal-free dyestuff is after-treated with an aqueous solution which contains a basic formaldehyde condensation product of a compound containing at least once the atomic grouping

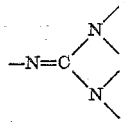

or a compound, such as cyanamide, easily convertible into a compound containing the said atomic grouping, and which solution also contains a water-soluble copper compound, and especially a water-soluble complex copper compound. Such processes are described, for example, in British Patent No. 619,969.

Coppered dyeings obtainable with the new dyestuffs are distinguished by their good level character, interesting tints, and in many cases by their desirable brown tints, and also by their good properties of fastness to washing and light.

The following examples illustrate the invention, the parts and percentages being by weight:

Example 1

32.2 parts of 2-(3'-amino-4'-hydroxyphenyl)-benzthiazole-X-sulfonic acid are dissolved in 300 parts of water with the addition of 5.5 parts of anhydrous sodium carbonate, 7 parts of sodium nitrite are added, and diazotization is brought about by the addition of 30 parts of hydrochloric acid of 30 percent strength. The yellow suspension of the diazo compound is coupled with a solution, rendered alkaline with sodium carbonate, of 11 parts of 1:3-dihydroxybenzene, and stirring is carried on to complete the coupling. The mixture is acidified with hydrochloric acid and filtered. The filter residue is dissolved in water with the addition of 20 parts of sodium carbonate, and then coupled with the diazo-azo-compound which is obtained in the usual manner by coupling the tetrazo-compound of 18.4 parts of 4:4'-diaminodiphenyl on one side with 14 parts of 1-hydroxybenzene-2-carboxylic acid in alkaline solution. The resulting trisazo-dyestuff precipitates out. It is filtered off and dried. It dissolves in water with a brown coloration and dyes cotton by the single bath or 2-bath after-coppering process brown tints which are fast to washing and very fast to light.

The 2-(3'-amino-4'-hydroxyphenyl)-benzthiazole-X-sulfonic acid used in this example can be obtained by sulfonating the 2-(3'-amino-4'-hydroxyphenyl)-benzthiazole prepared as described in German Patent No. 541,567. The sulfonation is carried out at 30–40° C. with oleum of 20–30 percent strength.

By using, instead of 1-hydroxybenzene-2-carboxylic acid, a corresponding amount of 1-hydroxy-2-methylbenzene-6-carboxylic acid or 1-hydroxy-2-chlorobenzene-6-carboxylic acid, there is obtained a dyestuff having similar properties.

Dyestuffs having similar properties are also obtained by using, instead of 2-(3'-amino-4'-hydroxyphenyl)-benzthiazole-X-sulfonic acid, 2-(3'-amino-4'-hydroxyphenyl)-6-methylbenzthiazole-X-sulfonic acid or 2-(3'-amino-4'-hydroxyphenyl) - 6 - methoxy - benzthiazole - X - sulfonic acid or 2-(3'-amino-4'-hydroxyphenyl)-benzthiazole.

Instead of tetrazotized 4:4'-diaminodiphenyl there may be used equimolecular quantities of tetrazotized 3:3'-dimethyl- or 3:3'-dimethoxy-4:4'-diaminodiphenyl.

Example 2

To a tetrazo-solution prepared from 18.4 parts of 4:4'-diaminodiphenyl there is added a neutral solution of 44.3 parts of the monoazo-dyestuff obtainable by coupling diazotized 2-(3'-amino-4'-hydroxyphenyl)-benzthiazole-X-sulfonic acid with 1:3-dihydroxybenzene, and 20 parts of sodium acetate, and about 100 parts of a sodium carbonate solution of 10 percent strength are run slowly into the coupling mixture. As soon as the tetrazo-compound can no longer be detected, the resulting diazo-azo-compound is coupled with a solution of 17.4 parts of 1-phenyl-3-methyl-5-pyrazolone and 15 parts of sodium bicarbonate, and the whole is stirred until the coupling is finished. The dyestuff is salted out and filtered. When dry it is a dark powder. It dissolves in water with a brown coloration and dyes cotton brown tints.

Example 3

100 parts of cotton are entered at 50° C. into a dyebath which contains in 4000 parts of water 1 part of the trisazo-dyestuff obtainable as described in the first paragraph of Example 1 and 2 parts anhydrous sodium carbonate, the temperature is raised to 90–95° C. in the course of 20 minutes, 40 parts of crystalline sodium sulfate are added, and dyeing is carried on for 30 minutes at 90–100° C. The bath is then allowed to cool to about 70° C., 1 part of complex sodium copper tartrate of approximately neutral reaction is added, coppering is carried on for ½ hour at about 80° C., and then the dyeing is rinsed with cold water. If desired, the dyeing may be soaped by after-treatment with a solution which contains 5 parts of soap and 2 parts of anhydrous sodium carbonate in 1000 parts by volume of water. There is obtained a brown dyeing of good fastness to light and washing.

Example 4

A dyestuff yielding brown tints on cotton by the single or two-bath coppering process is obtained if in the procedure described in the first paragraph of Example 1 the 11 parts of 1:3-dihydroxybenzene are replaced by 16 parts of 1:3-dihydroxynaphthalene.

What is claimed is:

1. A trisazo dyestuff of the formula

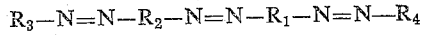

in which $R_1$ represents a dihydroxyaryl radical selected from the group consisting of the radicals of 1:3-dihydroxybenzene and 1:3-dihydroxynaphthalene, which radical is bound to each of the azo linkages in a position vicinal to a hydroxyl group, $R_2$ represents a 1:1-diphenyl radical bound to the azo linkages in 4- and 4'-position, $R_3$ represents a member selected from the group consisting of the radical of a 1-hydroxybenzene-2-carboxylic acid bound in 4-position to the azo linkage and the radical of a 5-pyrazolone bound in 4-position to the azo linkage, and $R_4$ represents an aryl-thiazolyl-hydroxybenzene radical bound to the azo linkage in ortho-position to the hydroxyl group.

2. A trisazo dyestuff of the formula

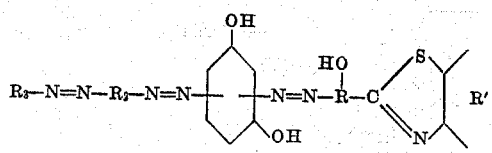

in which the hydroxyl groups of the 1:3-dihydroxybenzene radical are each in ortho-positions to at least one azo linkage, $R_2$ represents a 1:1'-diphenyl radical bound to the azo linkages in 4- and 4'-position, $R_3$ represents the radical of a 1-hydroxybenzene-2-carboxylic acid bound in 4-position to the azo linkage, and R and R' represent benzene radicals, the hydroxyl group bound to R is in ortho-position to the azo linkage and the benzene radical R' is fused on to the thiazole ring in the positions indicated by the valence bonds.

3. A trisazo dyestuff of the formula

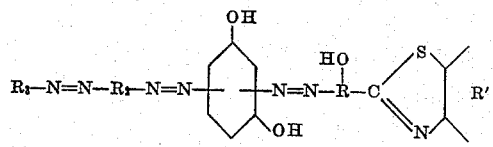

in which the hydroxyl groups of the 1:3-dihydroxybenzene radical are each in ortho-positions to at least one azo linkage, $R_2$ represents a 1:1'-diphenyl radical bound to the azo linkages in 4- and 4'-position, $R_3$ represents the radical of a 5-pyrazolone bound to the azo-linkage in 4-position, and R and R' represent benzene radicals, the hydroxyl group bound to R is in ortho-position to the azo linkage and the benzene radical R' is fused on to the thiazole ring in the positions indicated by the valence bonds.

4. A trisazo dyestuff of the formula

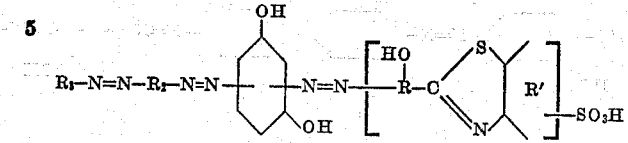

in which the hydroxyl groups of the 1:3-dihydroxybenzene radical are each in ortho-positions to at least one azo linkage, $R_2$ represents a 1:1'-diphenyl radical bound to the azo linkages in 4- and 4'-position, $R_3$ represents the radical of a 1-hydroxybenzene-2-carboxylic acid bound in 4-position to the azo linkage, and R and R' represent benzene radicals, the hydroxyl group bound to R is in ortho-position to the azo linkage and the benzene radical R' is fused on to the thiazole ring in the positions indicated by the valence bonds.

5. A trisazo dyestuff of the formula

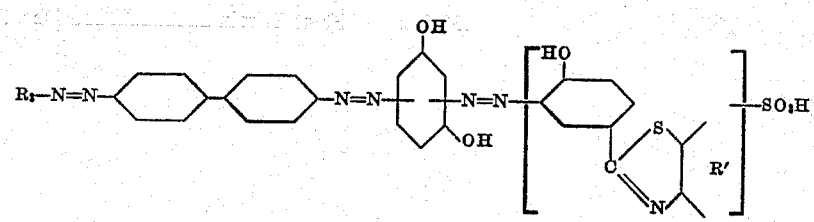

in which the hydroxyl groups of the 1:3-dihydroxybenzene radical are each in ortho-positions to at least one azo linkage, $R_3$ represents the radical of a 1-hydroxybenzene-2-carboxylic acid bound in 4-position to the azo linkage, and R' represents a benzene radical fused on to the thiazole ring in the positions indicated by the valence bonds.

6. A trisazo dyestuff of the formula

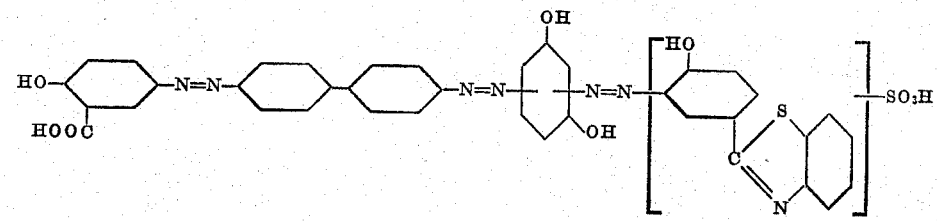

in which the hydroxyl groups of the 1:3-dihydroxybenzene radical are each in ortho-position to at least one azo linkage.

7. A trisazo dyestuff of the formula

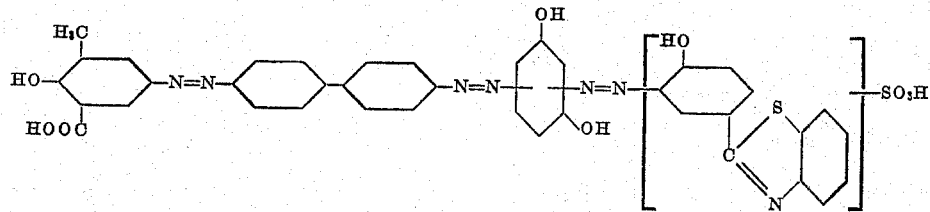

in which the hydroxyl groups of the 1:3-dihydroxybenzene radical are each in ortho-position to at least one azo linkage.

8. A trisazo dyestuff of the formula
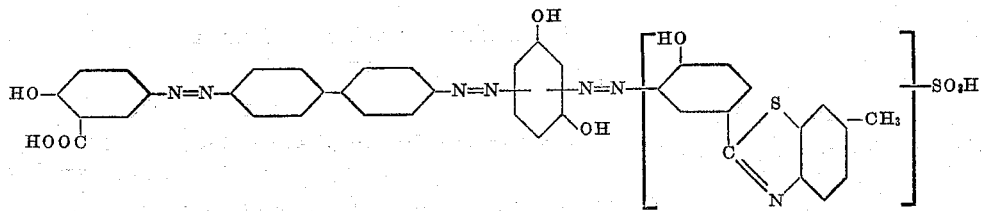
in which the hydroxyl groups of the 1:3-dihydroxybenzene radical are each in ortho-position to at least one azo linkage.
References Cited in the file of this patent
UNITED STATES PATENTS
2,112,405    Mayer et al. _____ Mar. 29, 1938
FOREIGN PATENTS
439,372    Great Britain _____ Dec. 5, 1935